United States Patent
Cokeley

(10) Patent No.: US 7,547,044 B2
(45) Date of Patent: Jun. 16, 2009

(54) ANTI-ROLLOVER DEVICE FOR TRAILERS AND MOBILE HOMES

(76) Inventor: Donald E. Cokeley, P.O. Box 490, Fallbrook, CA (US) 92028

( * ) Notice: Subject to any disclaimer, the term of this patent is extended or adjusted under 35 U.S.C. 154(b) by 0 days.

(21) Appl. No.: 11/700,741

(22) Filed: Jan. 30, 2007

(65) Prior Publication Data

US 2008/0179868 A1  Jul. 31, 2008

(51) Int. Cl.
*B60S 9/14* (2006.01)
(52) U.S. Cl. .................... 280/755; 280/475
(58) Field of Classification Search ............ 280/763.1, 280/761, 124.127, 124.116, 755, 490.1, 491.1, 280/491.2, 491.3, 491.4, 491.5, 475, 476.1, 280/766.1; 180/209; 212/305
See application file for complete search history.

(56) References Cited

U.S. PATENT DOCUMENTS

| | | | | | |
|---|---|---|---|---|---|
| 2,750,204 | A | * | 6/1956 | Ohrmann | ................. 280/755 |
| 2,854,084 | A | | 9/1958 | Isaac | |
| 2,957,592 | A | | 10/1960 | Thacker | |
| 3,046,037 | A | * | 7/1962 | Cain | ................. 280/477 |
| 3,125,352 | A | * | 3/1964 | Gouin | ................. 280/763.1 |
| 3,235,285 | A | * | 2/1966 | Tenenbaum et al. | ................. 280/423.1 |
| 3,253,839 | A | * | 5/1966 | Warren | ................. 254/419 |
| 3,279,812 | A | * | 10/1966 | Rizzuto | ................. 280/5.2 |
| 3,448,998 | A | | 6/1969 | Abolins | |
| 3,567,271 | A | * | 3/1971 | Gostomski | ................. 296/164 |
| 3,622,178 | A | * | 11/1971 | Tantlinger et al. | ................. 280/766.1 |
| 3,711,118 | A | * | 1/1973 | Kirwan | ................. 280/763.1 |
| 3,831,210 | A | * | 8/1974 | Ow | ................. 280/414.5 |
| 3,877,727 | A | | 4/1975 | Johannsen | |
| 3,902,733 | A | * | 9/1975 | David | ................. 280/47.18 |
| 3,942,449 | A | * | 3/1976 | Nelson | ................. 104/107 |
| 3,944,259 | A | * | 3/1976 | Miller | ................. 280/475 |
| 4,053,171 | A | * | 10/1977 | Hyler | ................. 280/124.116 |
| 4,150,840 | A | * | 4/1979 | Banerjea et al. | ................. 280/429 |
| 4,707,971 | A | | 11/1987 | Forpahl et al. | |
| 4,779,889 | A | * | 10/1988 | Morrison | ................. 280/475 |
| 4,805,542 | A | | 2/1989 | Peterson et al. | |
| 4,871,183 | A | * | 10/1989 | Moss | ................. 280/475 |
| 4,886,290 | A | * | 12/1989 | Pourchon et al. | ................. 280/6.152 |
| 5,040,937 | A | * | 8/1991 | Godbersen | ................. 414/559 |
| 5,195,764 | A | * | 3/1993 | Schantz et al. | ................. 280/43.23 |
| 5,282,605 | A | * | 2/1994 | Sauber | ................. 254/420 |
| 5,378,020 | A | | 1/1995 | Horn | |
| 5,465,989 | A | | 11/1995 | Grove | |
| 5,628,377 | A | | 5/1997 | Le Gloan | |
| 5,640,814 | A | | 6/1997 | Godfrey | |
| 5,785,330 | A | * | 7/1998 | Shoquist | ................. 280/81.6 |

(Continued)

FOREIGN PATENT DOCUMENTS

DE  2364296  6/1975

*Primary Examiner*—John Q. Nguyen
*Assistant Examiner*—Karen Amores
(74) *Attorney, Agent, or Firm*—Donn K. Harms

(57) ABSTRACT

A rollover inhibitor to help prevent towed vehicles from rolling over while being towed in high winds. The device features a rotatable elongated member having a wheel on a distal end which engages to a frame mount adapted to engage the frame structure of towed vehicles such as mobile homes. When tipped by the wind, the wheel engaged to the member will prevent over rotation of the trailer around its axis and thereby inhibit the potential for rolling over. The wheel is spaced a distance from the road surface so as to only contact it if the trailer tips past a predetermined point.

15 Claims, 3 Drawing Sheets

U.S. PATENT DOCUMENTS

| | | | |
|---|---|---|---|
| 5,823,558 A * | 10/1998 | Shoquist | 280/405.1 |
| 5,904,218 A | 5/1999 | Watkins | |
| 5,980,217 A * | 11/1999 | Swartz et al. | 417/234 |
| 6,164,679 A * | 12/2000 | Lay | 280/414.1 |
| 6,176,458 B1 * | 1/2001 | Stryke | 248/351 |
| 6,213,491 B1 * | 4/2001 | Southard, Jr. | 280/475 |
| 6,247,712 B1 * | 6/2001 | Smith et al. | 280/86.5 |
| 6,302,381 B1 * | 10/2001 | Roll | 254/425 |
| RE37,492 E * | 1/2002 | Shoquist | 280/81.6 |
| 6,557,894 B2 * | 5/2003 | Lange | 280/766.1 |
| 6,820,887 B1 * | 11/2004 | Riggle | 280/476.1 |
| 7,219,914 B2 * | 5/2007 | Huddleston | 280/475 |
| 2004/0075242 A1 * | 4/2004 | Richards | 280/478.1 |
| 2005/0173892 A1 * | 8/2005 | Terminello | 280/490.1 |
| 2005/0206149 A1 * | 9/2005 | Mulhern et al. | 280/755 |
| 2006/0017241 A1 * | 1/2006 | Hanscom | 280/6.153 |
| 2006/0082079 A1 | 4/2006 | Eichhorn et al. | |
| 2007/0040369 A1 * | 2/2007 | Lotman | 280/763.1 |

* cited by examiner

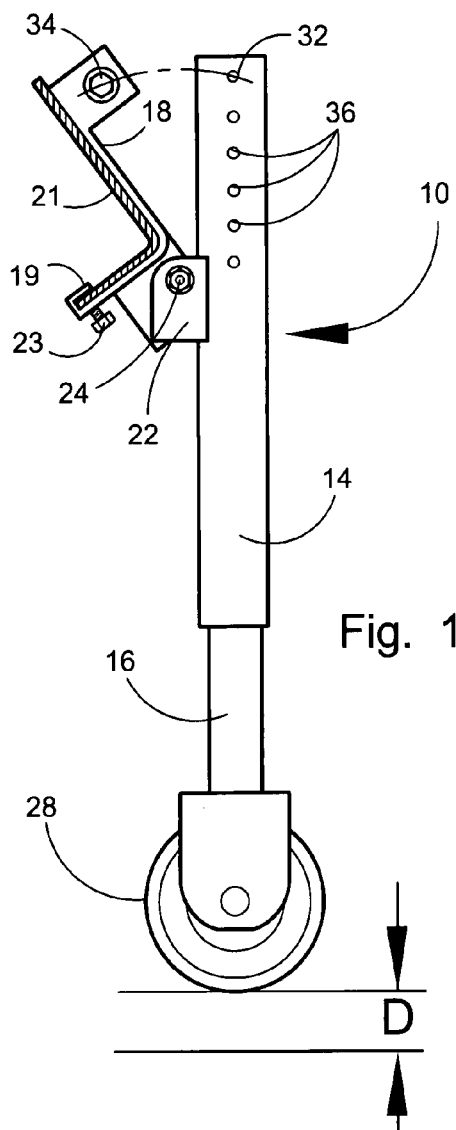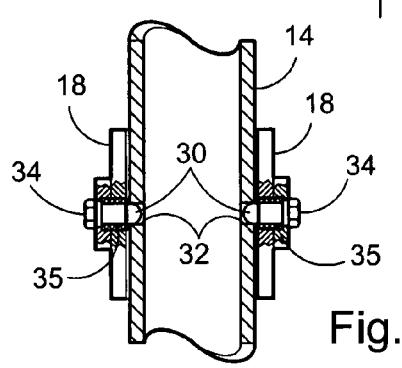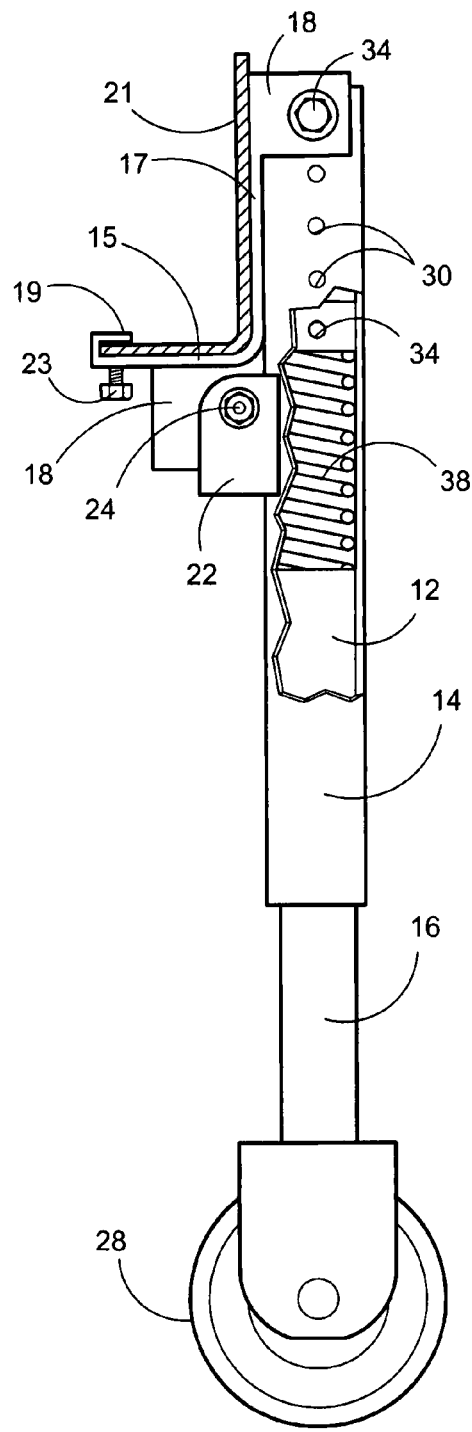
Fig. 1
Fig. 2A
Fig. 2

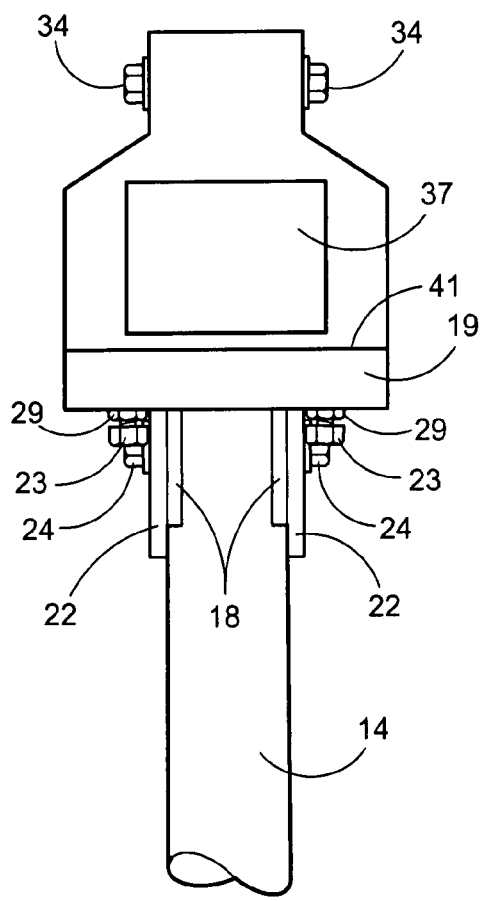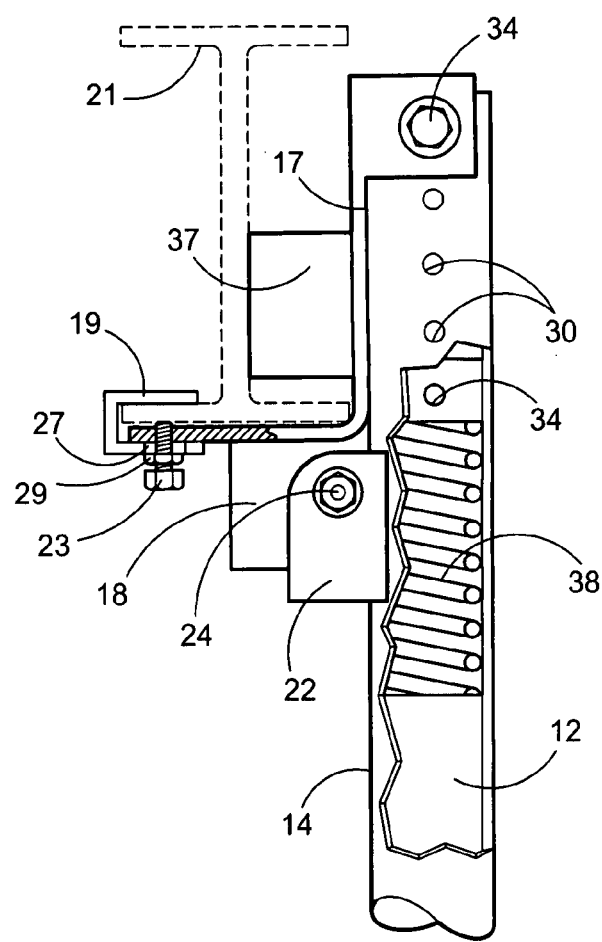
Fig. 5
Fig. 6

ANTI-ROLLOVER DEVICE FOR TRAILERS AND MOBILE HOMES

FIELD OF INVENTION

The device and method herein provide anti-rollover protection for large trailers and mobile homes being towed. More particularly the disclosed device and method provide an easily engaged shock absorbing wheeled member adapted for engagement to the frames of large mobile homes to greatly reduce oversway and dipping of the mobile home during towing and thereby greatly reduce rollovers.

BACKGROUND

Mobile homes and other wheeled portable structures such as classrooms are structures built in substantially rectangular components at factories, rather than on a site. They are then towed to the location where they will be occupied by homeowners or students or businesses. Because of their large size and wheeled chassis, such portable structures are usually transported by semi-trucks and towed over public highways. They are less expensive per square foot than site-built homes, and being portable, offer great mobility to homeowners, school districts, and businesses requiring temporary or long term structures that can be relocated as needed.

The two major forms of manufactured homes and structures such as classrooms are single-wides and double-wides. Single-wides are sixteen feet or less in width and can be towed to their site as a single unit. Double-wides are twenty feet or more wide and are towed to their site in two separate units, which are then joined together. Triple-wides and even homes and structures with four, five, or more units are also manufactured, although not as commonly.

A common factor with all such portable wheeled structures is their need for towing and their susceptibility to sway and rollover in high winds. High winds can create havoc when towing mobile homes and structures causing oscillations or sudden pulling to one side and with sufficient wind loading, a rollover. For example, if a hard gust of wind hits the towed structure from the left it will thereafter sway and pitch and move to the right.

In cases where winds are exceptionally high such as on the California desert highways, wind gusts can reach more than 70 miles an hour which is a speed sufficient to tear the doors off of cars when they are opened at inopportune times. As most mobile homes and large mobile structures are substantially flat on both long sides, they make a perfect sail to catch the force of such gusts. If the gust is sufficiently strong and of sufficient duration, the force will tilt the towed structure so far as to expose the underside or floor of the structure to the wind. If this happens, the extra torque provided by the wind lifting the bottom of the structure as well as tilting the top of the sidewall of the structure, will cause a rollover. Many double-wide structures have met an untimely demise in the desert winds of the Southwest.

Most professional truck drivers, when presented with high winds, will seek protection from the wind under overpasses or at truck stops or other places of refuge. Thereafter, they will wait the storm out before proceeding. However, on many occasions, such winds arise without warning or exceed predicted velocities, and it is then that even professional drivers will encounter a high risk of rollover of their towed structure.

As noted above, the high winds will first sway the towed vehicle. When that force on one large flat side of the towed vehicle reaches a sufficient load, the wind will begin to lift or twist the towed structure around its long center axis. Generally when one side begins to lift, it will expose the underbelly of the towed structure to the wind in combination with the already tilted side surface. Such a presentation of new surface for windload due to its slanted presentation to oncoming wind will increase the windload and will also provide lift to the structure to rotate it around its center axis. The combination will eventually yield a combined lateral force and lift force to cause a rollover.

However, if the lifting of the floor of the towed structure can be limited or greatly reduced, it will not provide the wind a surface with which to generate extra lateral force and/or lifting force to the structure. Many professional truck drivers have observed that the rearmost portion of the towed structure, behind its axle, is the area most prone to twist to the point that the floor of the structure rotates and begins to generate lift. In order for this rotation to occur on one side of the structure, especially to the rear of the axle, the front corner on the opposite side of the towed structure must dip and move closer to the road surface. Consequently, a dip limiting device which will greatly reduce either front corner of the towed vehicle from dropping toward the road surface would impart force to the structure to resist additional sway and tilt, and would greatly reduce the floor of the structure from rising to become a sail for oncoming wind to generate lift.

While other devices exist that attempt to greatly reduce rollover and sway by imparting a force to the towed structure, most such devices use the axle and frame and biasing thereto in their attempt to limit sway and eventual rollover. While such devices might work with an SUV or large car or motorhome, they have not been employed with great success on large towed structures such as mobile homes or portable classrooms.

As such, there exists an unmet need for a method and apparatus that is easily deployed and engaged to large mobile structures being towed, that will limit the drop of the front corners of that structure toward the road surface during towing to thereby impart force to the structure to limit lifting of the floor on either side. Such a device should be easily engageable to existing conventionally constructed mobile homes. Such a device should be inoperable unless winds of sufficient force cause a drop of the front corners to which it is engaged and should also provide accommodation for road hazards which it might encounter during use.

With respect to the above, before explaining at least one preferred embodiment of the invention in detail, it is to be understood that the invention is not limited in its application to the details of construction and to the arrangement of the components or steps set forth in the following description or illustrated in the drawings. The various apparatus and methods of the invention are capable of other embodiments and of being practiced and carried out in various ways which will be obvious to those skilled in the art once they review this disclosure. Also, the phraseology and terminology employed herein are for the purpose of description and should not be regarded as limiting.

Also, those skilled in the art will appreciate that the conception upon which this disclosure is based may be utilized as a basis for designing of other devices, methods and systems for carrying out the several purposes of the disclosed device. It is important, therefore, that the advantages and claims be regarded as including such equivalent construction and methodology in that they do not depart from the spirit and scope of this invention.

SUMMARY OF THE INVENTION

There is disclosed and described herein, an anti-rollover device and method of deployment which meets the aforementioned shortfalls in this area of art. The device features an assembly having a telescopic member rotationally engaged to a frame mount which itself is adapted for easy engagement to the metal frames conventionally employed to support the floors and walls of such mobile structures on an axle. The telescopic member is adjustable in length through the provision of a pin adapted for engagement in a series of spaced apertures at the upper end of a first component of the telescopic member. Changing the pin position allows for a length change of the other end of the telescopic member to position a wheel on the distal end a distance above the road surface during normal travel of the towed structure over a roadway. Should the structure tip sufficiently to drop one of the leading corners toward the road surface, the wheeled distal end of the telescopic member will contact the road. A progressively increasing resistive force against the dipping is provided by the inclusion of a biasing means to bias the telescopic components of the device apart. The biasing means concurrently offers a means for shock absorption during any short period of time the wheel contacts the road surface. Finally, a unique hinged engagement of the telescopic member to the frame mount provides for a rearward rotation to allow the member to overcome any road obstacles such as rocks which might strike it during travel. Once past the obstacle, gravity will return the telescopic member to an operable position with the top end of the telescopic member frictionally engaged to the frame mount.

The device, once engaged to the front corner areas of a mobile home or structure being towed, will thereafter greatly reduce dipping of the front corners and impart return force to the structure to greatly reduce oversway that exposes the floor of the structure to windload and lift. It thereby provides an excellent means to greatly reduce rollover of large mobile homes and structures being towed in windy areas.

In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other methods and systems for carrying out the several purposes of the present invention. It is important, therefore, that the claims be regarded as including such equivalent construction insofar as they do not depart from the spirit and scope of the present invention.

It is an object of this invention to provide a method and apparatus for greatly reducing the rollover of large towed structures such as mobile homes in high winds.

It is a further object of this invention to provide such a method and apparatus that is adapted for easy engagement to the frame supporting the floor of such mobile structures.

It is a further object of this invention to provide such a device for rollover reduction that will contact the road surface to greatly reduce rollover and return to a position out of contact with the road once the danger has passed.

Yet an additional object of this invention is providing such an anti-rollover device which also is adapted to accommodate any road hazards such as rocks which might impact it and then return to an operable position.

An additional object of this invention is the provision of such a device which is adjustable to the height of the mobile structure to which it is attached using translating components that are adjustable.

A further object of this invention is the provision of a means for shock absorption during contact of the wheeled end of the device with a road surface.

There has thus been outlined, rather broadly, the more important features of the invention in order that the detailed description thereof may be better understood and in order that the present contribution to the art may be better appreciated. There are additional features of the invention that will be described hereinafter and which will form the subject matter of the claims appended hereto.

These together with other objects and advantages which will become subsequently apparent reside in the details of the construction and method as more fully hereinafter described and claimed, reference being had to the accompanying drawings forming a part thereof, wherein like numerals refer to like parts throughout.

BRIEF DESCRIPTION OF THE DRAWING FIGURES

FIG. 1 depicts a side view of the telescopic member of the device and its rotational engagement to a frame mount adapted to engage the mobile structure.

FIG. 2 depicts a close up view of the frame mount and rotational engagement to the telescopic member, as well as a pinned engagement allowing for lengthening and shortening of the member to adapt to the towed vehicle height.

FIG. 2*a* depicts an end view of frame mount with frictional engagement of biased pins in detents.

Figure 3:
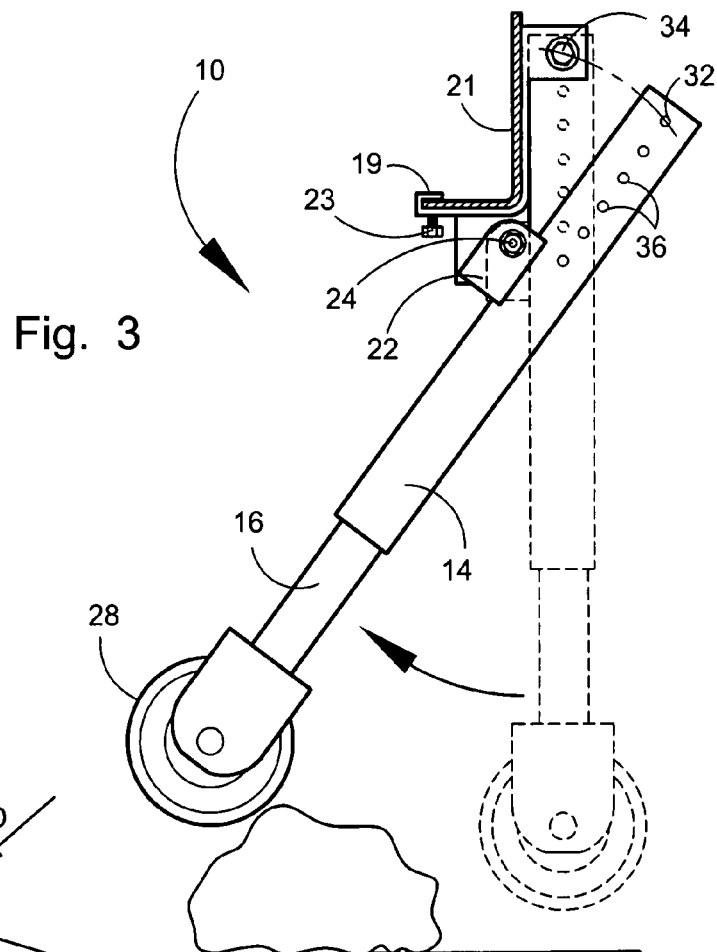

FIG. 3 depicts the rotation of the telescopic member when struck by a road hazard sufficient to overcome a frictional engagement of the frame mount with the upper end of the member.

Figure 4:
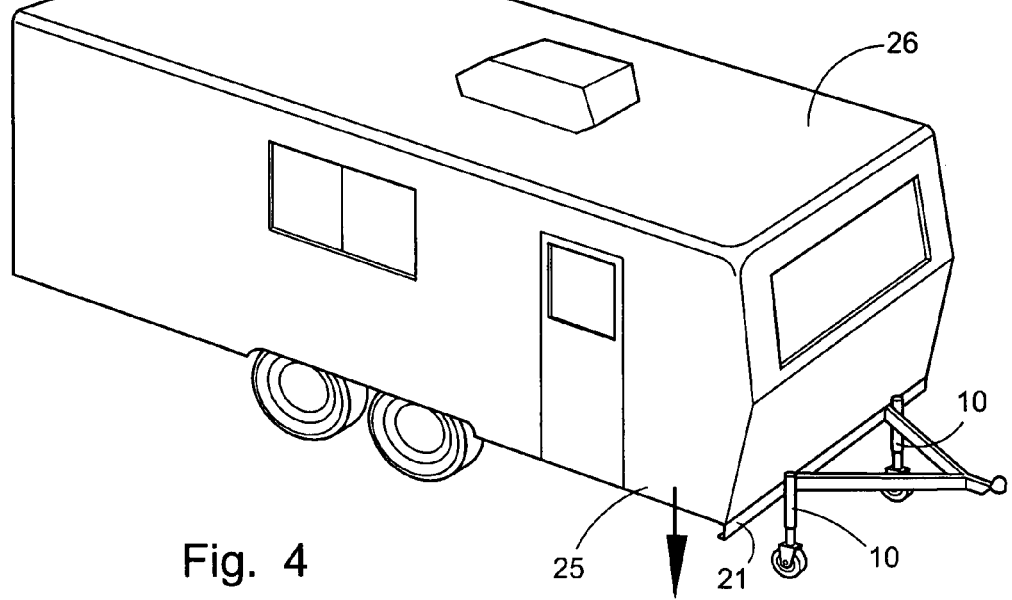

FIG. 4 shows a perspective view of the device engaged at the frontwall of a towable structure adjacent to the corners with the wheeled end a distance from the road surface.

FIG. 5 depicts an especially preferred mode of the device herein having a clip on the frame mount that adjusts to accommodate different sized vehicle frames.

FIG. 6 is a slice through FIG. 5 showing the slotted clip and bolt engagement and adaptability for different shaped vehicle frames.

DETAILED DESCRIPTION OF THE PREFERRED EMBODIMENTS OF THE DISCLOSED DEVICE

Referring now to the drawings in FIGS. 1-6, the device 10 is shown in the current preferred mode in accordance with the present invention. The device 10 employs an elongated member 12 which is preferably telescopic in construction having a first component member 14 slidably engaged with a second component member 16. However, those skilled in the art will realize that a biased translatable engagement of a single piece member 12, to the frame mount 18, may also provide the function herein taught of an adjustable member for greatly reducing dipping of the towed vehicle past a designated distance, and such is anticipated within the scope of this invention.

The elongated member 12 in the preferred mode of the device 10 is rotationally engaged to the frame mount 18 using a means for rotational engagement of an upper portion of the elongated member 12 to the frame mount 18 such as the hinge formed by extending parallel tabs 22 from the member 12 engaged with bolt 24 which extends through an aperture on the frame mount 18.

As shown in FIG. 1 and FIG. 4, the device 10 is depicted in an operating position a distance "D" above the road surface. The rotational engagement of the member 12 to the frame mount 18, along with a means for adjustable frictional engagement of the top portion of the member 12 to the frame mount 18, provide a means to release the member 12 from a substantially vertical position as shown in FIG. 1, to an elevated position as shown in FIG. 3.

This is an important countermeasure to greatly reduce damage to the device 10 and the towed vehicle 26 to which it engages. Of course the force of the wheel 28 on the distal end of the member 12 by itself can cause the rotation; consequently, a means for adjustable pressured engagement of the member 12 in an upright position is provided by an adjustable pressure mount shown in FIG. 2a. As shown, two detents or apertures 32, in opposing side surfaces of the first frame member 14 are engaged by two spring biased pins 30. Sufficient force to dislodge the pins 30 from the detents 32 is required to allow rotation of the member 12. Means to adjust the force required for a release of the pins 30 from the detents 32 allowing rotation is provided by adjustment of the force of the bias of the pins 30 into the detents 32 by screw 34 which compresses biasing springs 35 to allow the user to set the pressure sufficient to keep the wheel 28 on the road surface but allow a release in case of a debris strike and a rotation out of the way. In cases of a debris strike, the member 12 and wheel 28 will rotate rearward as in FIG. 3 and gravity will allow the member 12 to return to the pressured frictional engagement of FIG. 2 once the debris is passed over by the device 10.

The device 10 as noted is best engaged to the front corner areas of a towed vehicle 26 and the proper distance "D" set by translating the distal end of the member 12 with the wheel 28 a distance "D" above the roadway which is determined in advance. Engagement to the front of the towed vehicle 26 is provided by the frame mount 18 which is adapted for a pressured engagement of a flange 19 with the angle iron framework 21 conventionally employed in mobile homes and structures that are towed. A compression bolt 23 is tightened to compress the flange 19 against the framework 21 with the vertical component of the frame mount 18 against the front wall 25 of the towed vehicle 26.

Means to translate the distal end and wheel 28 is currently provided by a pin 36 adapted to engage the top end of the second frame member 10 with differing points on the first frame member 14. Changing the pin 34 position into the different apertures 36 provides for a change in distance "D" of the engaged wheel 28 above the road surface.

Further, in an especially preferred mode of the device 10 a progressively increasing resistive force against the dipping of the towed vehicle is provided by the inclusion of a biasing means to bias the telescopic components of the elongated member 12 away from each other. If a single piece member 12 were used it would be biased in a similar fashion from the frame mount 18. The biasing means, which is shown as spring 38 attached at a first end to the second frame component 16 and at a second end to the pin 34, concurrently offers a means for shock absorption during any short period of time the wheel 28 contacts the road surface should wind force one side surface of the towed vehicle to rotate along its axis.

Also in an especially preferred mode of the device 10, the flange 19 is in a slidable engagement with the frame mount 18 at a rear edge thereof as shown in FIG. 6. In this mode of the device 10 the engagement is rendered slidably adjustable by the distance of translation of the flange 19 using means for adjustable engagement of the flange 19 to the frame mount 18 to allow translation toward and away from the framework 21 of the vehicle whether it be an angle iron type configuration of framework 21 in FIG. 2 or an "I" Beam type configuration FIG. 6. The means for adjustable slidable engagement of the flange 19 to the frame mount 18 thereby allows the device to adapt to different sized framework 21 construction which happens when steel products are shipped from different vendors and different countries. The total distance toward or away from the framework 21 which the flange 19 will translate is determined in the current preferred mode of the device 10 by a slot 27 through which the bolt 23 engages with the flange 19 and a nut 29 engaged on the bolt 23 which is tightened to compress the flange 19 against the frame mount 18. Of course those skilled in the art will realize that other means for translatable engagement of the flange 19 to the frame mount 18 may be employed that will allow for the flange to be placed in an adjustable fixed engagement to the frame mount 18 to account different sized framework 21, and all are considered within the scope of this patent.

A further component included in the especially preferred mode of the device 10 provides means for spaced engagement of the framework 21 supporting the vehicle from the sidewall 17 portion of the frame mount 18. This spacing component shown as a projecting ledge 37 from the sidewall 17 allows the device 10 to accommodate both a rectangular or "L" shaped framework as shown in FIG. 2 or an "I" beam type configuration of the framework 21 shown in FIG. 6 thereby allowing great adaptability to the device 10 especially when combined with the flange 19 being removably engageable. The accommodation for the I beam style is provided by the gap 41 adjacent to the communication of the sidewall 17 with the substantially perpendicular bottom wall 15 of the frame mount 18.

In a method of use of the device as an anti-rollover system for a towed mobile home or towed vehicle 26, the frame mount 18 would be engaged to the metal framework 21 of the towed vehicle to place one device 10 adjacent to each corner. The distance "D" would be set by translation of the member 12 to translate the wheel 28 on the distal end the predetermined distance above the roadway to be traveled. The towed vehicle 26 would be moved to its new site and the device removed.

The device herein for reducing tendencies of rollover of a towed mobile home or similar towed vehicle, as disclosed and described herein, discloses steps in a process, arrangements of elements of particular construction, and configuration for illustrating preferred embodiments of structure and method of operation of the present invention. It is to be understood, however, that elements of different construction and configuration and different steps and process procedures and other arrangements thereof, other than those illustrated and described, may be employed within the spirit of this invention.

As such, while the present invention has been described herein with reference to particular embodiments thereof, a latitude of modifications, various changes and substitutions are intended in the foregoing disclosure, and it will be appreciated that in some instance some features of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

What is claimed is:

1. A rollover inhibitor apparatus for towed vehicles during travel over a road surface, comprising:
   an elongated member having an engagement end and a distal end opposite said engagement end;
   a frame mount, said frame mount adapted to provide means for attachment of said elongated member in an engaged position, to a frame supporting said towed vehicles;
   a wheel located at said distal end of said elongated member; means to adjust a position of said wheel a distance above said road surface;
   said engagement end of said elongated member rotationally engaged to said frame mount;
   said rotational engagement allowing a rotation of said elongated member, from an operating position substantially upright with said wheel at said distance above said road surface, to a rotated position increasing said distance above said road surface;
   means for frictional engagement of said frame mount with said elongated member, said frictional engagement providing a resistance to said rotation of said member;
   said rotation providing a means for said wheel to traverse over debris on said road surface larger than said distance above said road surface;
   means for translation of said distal end of said elongated member toward and away from said frame mount;
   means to bias said distal end of said elongated member away from said frame mount at a biasing force, wherein said distal end of said elongated member will translate toward said frame mount upon a contact with said road surface exceeding said force; and
   whereby the rollover inhibitor comprises a pair of said elongated members, each engaged to a pair of respective frame mounts which are respectively engaged upon said frame adjacent to opposing sides of said towed vehicle, will inhibit said towed vehicle from rolling over through a contact with said road surface during a tipping of said towed vehicle.

2. The rollover inhibitor apparatus of claim 1 additionally comprising:
   means to adjust said biasing force.

3. The rollover inhibitor apparatus of claim 2 wherein said means for translation of said distal end of each of said elongated member toward and away from said respective frame mount comprises:
   each of said elongated member formed of a plurality of telescopically engaged member sections extending between said engagement end and said distal end.

4. The rollover inhibitor apparatus of claim 3 wherein said means for translation of said distal end of each of said elongated member toward and away from said respective frame mount comprises:
   a spring housed within a axial cavity extending through an interior of said plurality of telescopically engaged member sections;
   said spring having a first end engaged to a first of said telescopically engaged member sections which is engaged to said respective frame mount; and
   said spring having a second end, communicating force to a second of said member sections, said second of said telescopically engaged member sections engaged to said wheel.

5. The rollover inhibitor apparatus of claim 4 wherein said means to adjust said biasing force comprises:
   a plurality of apertures communicating through one of said first telescopically engaged member section or said second telescopically engaged member section;
   said plurality of apertures placed sequentially with each subsequent aperture being a distance further from said frame mount;
   a pin, said pin removably engageable with each of said apertures; and
   said pin providing communication of said biasing force from said spring to the respective of said first telescopically engaged member section and section member section having said apertures.

6. The rollover inhibitor apparatus of claim 4:
   said pair of frame mounts each comprising: a first section providing said means of attachment of said elongated member to said frame;
   a second section engaged to a central portion of said elongated member; and
   said first section rotationally engaged with said second section.

7. The rollover inhibitor apparatus of claim 6 additionally comprising:
   said first section having a pair of opposing walls extending therefrom, said opposing walls being adjacent to opposing sidewalls of said elongated member when in said operating position; and
   said means for frictional engagement provided by at least one of said pair of opposing walls, frictionally engaged against at least one of said opposing sidewalls.

8. The rollover inhibitor apparatus of claim 6 additionally comprising:
   said first section having a horizontal first wall having an engagement to a vertical second wall;
   said first wall extending a width distance to a "C" shaped flange portion located at a distal edge opposite said engagement to said vertical wall; and
   said width distance being slightly equal to or slightly larger than a width of said frame supporting said vehicle thereby allowing an engagement of said flange portion over a distal edge of said frame supporting said vehicle.

9. The rollover inhibitor apparatus of claim 8 additionally comprising:
   said flange portion translatably engageable to multiple positions adjacent to said distal edge to thereby vary said width distance to account different widths of said frame supporting said vehicle.

10. The rollover inhibitor apparatus of claim 1 wherein said means for translation of said distal end of each of said elongated member toward and away from said respective frame mount comprises:
    each of said elongated member formed of a plurality of telescopically engaged member sections extending between said engagement end and said distal end.

11. The rollover inhibitor apparatus of claim 1 wherein said means for translation of said distal end of each of said elongated member toward and away from said respective frame mount comprises:
    each of said elongated member formed of a plurality of telescopically engaged member sections extending between said engagement end and said distal end;

a spring housed within a axial cavity extending through an interior of said plurality of telescopically engaged member sections;

said spring having a first end engaged to a first of said member sections which is engaged to said respective frame mount; and said spring having a second end, communicating force to a second of said telescopically engaged member sections, said second of said member sections engaged to said wheel.

12. The rollover inhibitor apparatus of claim 1:

said pair of frame mounts each comprising: a first section providing said means of attachment of said elongated member to said frame;

a second section engaged to a central portion of said elongated member; and said first section rotationally engaged with said second section.

13. The rollover inhibitor apparatus of claim 12 additionally comprising:

said first section having a pair of opposing walls extending therefrom, said opposing walls being adjacent to opposing sidewalls of said elongated member when in said operating position; and said means for frictional engagement provided by at least one of said pair of opposing walls, frictionally engaged against at least one of said opposing sidewalls.

14. The rollover inhibitor apparatus of claim 12 additionally comprising:

said first section having a horizontal first wall having an engagement to a vertical second wall;

said first wall extending a width distance to a "C" shaped flange portion located at a distal edge opposite said engagement to said vertical wall; and said width distance being equal to or slightly larger than a width of said frame supporting said vehicle thereby allowing an engagement of said flange portion over a distal edge of said frame supporting said vehicle.

15. The rollover inhibitor apparatus of claim 14 additionally comprising:

said flange portion translatably engageable to multiple positions adjacent to said distal edge to thereby vary said width distance to account different widths of said frame supporting said vehicle.

* * * * *